United States Patent [19]
Aggarwal et al.

[11] Patent Number: 5,751,336
[45] Date of Patent: May 12, 1998

[54] PERMUTATION BASED PYRAMID BLOCK TRANSMISSION SCHEME FOR BROADCASTING IN VIDEO-ON-DEMAND STORAGE SYSTEMS

[75] Inventors: Charu Chandra Aggarwal, Cambridge, Mass.; Joel Leonard Wolf, Katonah; Philip Shi-Lung Yu, Chappaqua, both of N.Y.

[73] Assignee: International Business Machines Corporation, Armonk, N.Y.

[21] Appl. No.: 542,002

[22] Filed: Oct. 12, 1995

[51] Int. Cl.⁶ .................................................. H04N 7/173
[52] U.S. Cl. .......................... 348/7; 395/200.49; 455/4.2
[58] Field of Search .................................. 348/7, 12, 13, 348/14, 15, 16, 17, 18, 10; 455/4.2, 5.1, 6.1, 6.2, 6.3; 395/200.09, 200.49, 200.48, 200.47; H04N 7/16, 7/173

[56] References Cited
U.S. PATENT DOCUMENTS

5,559,764 9/1996 Chen et al. ............................... 348/7
5,606,359 2/1997 Youden et al. ........................... 348/7
5,608,448 3/1997 Smoral et al. ............................ 348/7

*Primary Examiner*—Christopher C. Grant
*Attorney, Agent, or Firm*—Richard M. Ludwin; Louis P. Herzberg

[57] ABSTRACT

Portions of multimedia program (presentation) are repetitively broadcast to receiving stations with subsequent portions being broadcast less frequently than preceding portions. Blocks of at least one of the portions are broadcast in varying permutations from one repetition to a next repetition. Further, each portion is of a length which is proportional to a sum of the lengths of all preceding portions. A receiver is provided with selects blocks to be skipped (in a pyramid type broadcast) based on information indicative of the permutation selected by the server. The receiver determines the number of blocks to skip before buffering the next block for the video being viewed.

11 Claims, 6 Drawing Sheets

PERMUTATION BASED PYRAMID BLOCK TRANSMISSION SCHEME FOR BROADCASTING IN VIDEO-ON-DEMAND STORAGE SYSTEMS

BACKGROUND OF THE INVENTION a. Field of the Invention

The present invention relates to the support of broadcasting for video-on-demand and near video-on-demand systems.

b. Related Art

Traditional video-on-demand (VOD) systems provide users with the flexibility of choosing both the movie that they wish to see as well as the time that they wish to see it. Such a system is modeled using a client-server architecture in which the client consists of a set of users, while the video server contains a number of disks on which the videos are stored. Whenever a request for a video is made by a client, its blocks are fetched from the disks by a centralized VOD server, and transferred to the client isochronously.

In the event that the video is not present on the disks, it is typically to be fetched from tertiary storage. Thus, for each individual request by a client, an I/O stream needs to be scheduled. Each scheduling of an I/O stream typically requires a considerable amount of the network bandwidth. As a result, as the number of clients increases, the bandwidth may turn out to be a serious constraint. One solution to this problem includes the sharing of bandwidth among users. This type of solution is referred to as the User Centered Approach.

As the number of clients increases, an alternative approach for video on demand systems is that of periodic broadcasting. In the broadcasting approach, bandwidth is dedicated to individual video objects rather than users. We assume that there are N movies (say, the N hot movies of the current year) which are broadcast periodically. Thus, in this case, the bandwidth is shared among the N different movies. As a result, the bandwidth utilization of this technique is independent of the number of clients. This approach is a Data Centered approach because the bandwidth is divided among the individual video objects.

In the conventional broadcasting method, the access time for each of the N movies is determined by the frequency of broadcasting. The access time (also referred to as the latency or client wait time) for the movie is simply equal to the time required to access the first segment. Thus the access time of a movie decreases linearly with the bandwidth. An alternative approach to reduce the bandwidth requirement is the "Pyramid" scheme. In this technique, each video is divided into multiple segments and the initial segments are shorter and are transmitted more frequently. The Pyramid scheme is discussed in the paper, "Metropolitan Area Video On Demand Service using Pyramid Broadcasting", by S. Vishwanathan and T. Imelinki, SPIE Vol. 2417, pp. 66–77 (February 1995). We shall subsequently refer to this scheme as the VI scheme.

Under the VI method, the access time for a movie is found to improve exponentially with the bandwidth. However, the VI method requires considerable amount of buffer requirements at the client end, which do not significantly change with the bandwidth. The VI method typically requires at each client a storage size which is substantially more than 50% of the length of the movie. In this range of storage sizes it may become necessary to use disks in order to do the buffering. Further, as the transmission rates may be significantly high, the client may need large disk bandwidth to write onto the disk as quickly as it is receiving the movie.

SUMMARY OF THE INVENTION

It is an object of the invention to reduce the client storage requirement in systems using a pyramid type scheme. It is a further object of the invention to reduce the rate that data needs to be written to the client storage for buffering in systems using a pyramid type scheme.

In accordance with a first aspect of the present invention, a given portion and a subsequent portion of an audio, video or audio-visual program are repetitively broadcast to receiving stations with the subsequent portion being broadcast less frequently than the given portion. Blocks of at least one of the portions are broadcast in varying permutations from one repetition to a next repetition.

In accordance with a second aspect of the present invention, portions of an audio, video or audio-visual program are repetitively broadcast to receiving stations with subsequent portions being broadcast less frequently than preceding portions. Each portion is of a length which is proportional to a sum of the lengths of all preceding portions.

In accordance with a third aspect of the present invention a receiver is provided with selects blocks to be skipped (in a pyramid type broadcast) based on information indicative of the permutation selected by the server. The receiver determines the number of blocks to skip before buffering the next block for the video being viewed.

In a preferred embodiment, the video server divides the channel bandwidth among the videos to be broadcast. Each video is divided into non-overlapping segments and each segment is further divided into blocks where a block is the basic unit of transmission. As in the VI scheme, the sizes and frequencies of transmission for the different segments of a video vary. However, instead of transmitting the blocks in each segment in sequential order, the present invention transmits these blocks in permutations. Advantageously, this reduces the buffer requirement at the client end.

BRIEF DESCRIPTION OF THE DRAWINGS

Like reference numerals appearing in more than one drawing depict like elements.

DETAILED DESCRIPTION OF A PREFERRED EMBODIMENT

Figure 3:
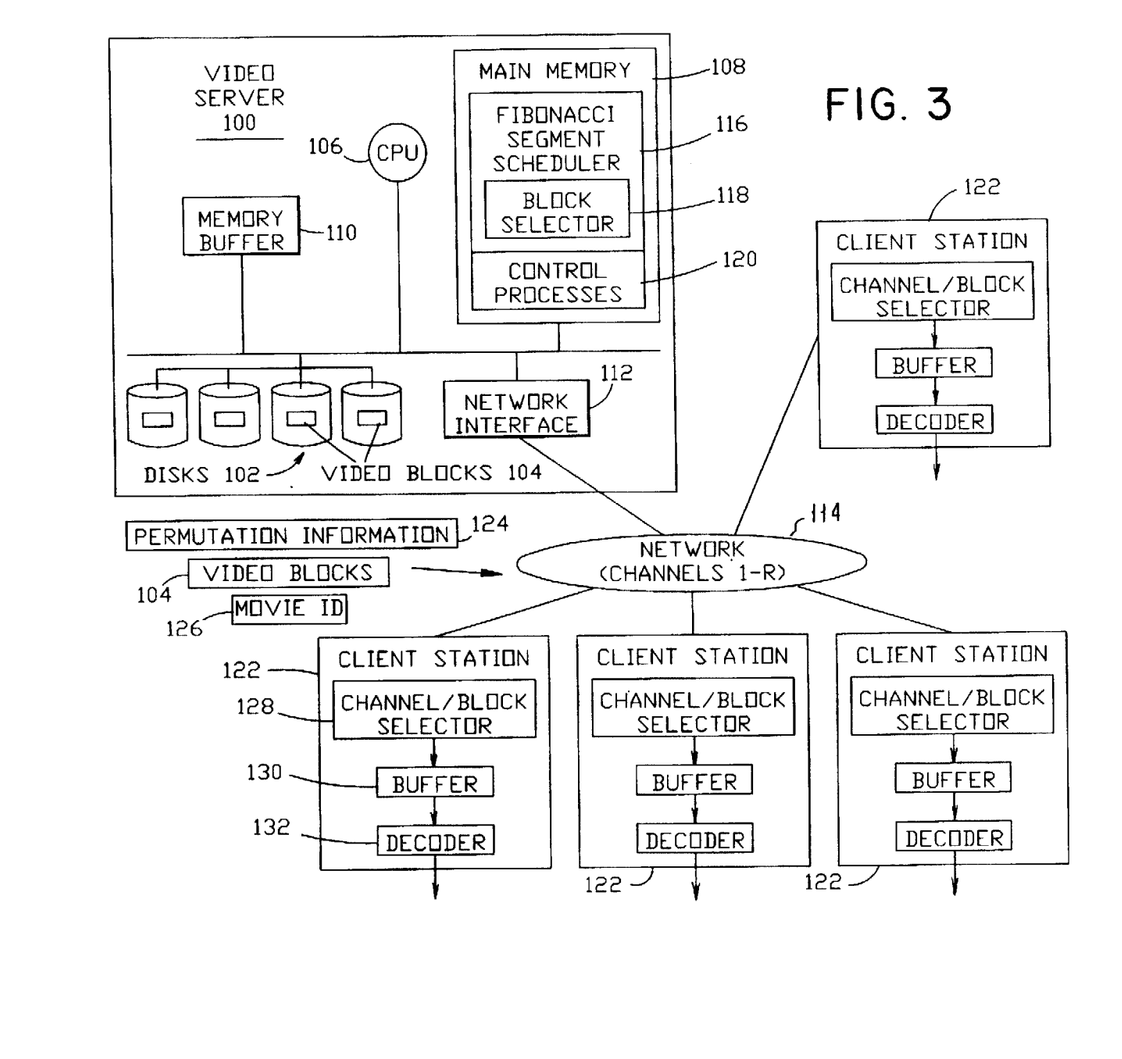
FIG. 3 is a block diagram of a video (multimedia) server system according to an embodiment of the present invention.

FIG. 3 is a block diagram of a video server system according to an embodiment of the present invention. The system includes a video server 100, wherein videos (such as movies) are stored in disks 102 in the form of a plurality of blocks 104 which can be striped across the disks. The video server 100 includes a processor (cpu) 106 which performs under control of program code (programs) stored in a main memory 108. The video server 100 also includes a memory buffer 110 for temporarily storing retrieved video blocks 104 and a network interface 112 for coupling the video server 100 to a communication network 114. The network interface 112 divides the communication network 114 into a number (R) of TDM channels onto which video data is be broadcast.

In accordance with an embodiment of the present invention, one of the programs which controls the operation of the video server 100 is a Fibonacci Segment Scheduler 116. The Fibonacci Segment Scheduler 116 includes a block selector 118 whose functions include selection of video blocks to retrieve from the disks 102 and the selection of a network channel for transmission. The block selector 118 works in conjunction with various convention control processes 120 to retrieve the selected blocks from the disks and to cause the selected blocks to be broadcast to client stations 122 by way of the communication network 114. As will be described in more detail later, the video blocks are periodically transmitted (broadcast) on the network 114 in various size segments along with permutation information 124. The video server 100 also broadcasts movie ID information 126 which identifies (to the client stations) which movie is being broadcast on which set of channels.

Each of the client stations 122 includes a channel/block selector 128 (which can be embodied using microprocessor executable program code) which selects appropriate channels and video blocks transmitted thereon for decoding and viewing by the client. The selected video blocks are provided to a buffer 130 where they are temporarily stored and then provided to a decoder 132 in proper temporal playout order.

The video server 100 can be embodied using any processor of sufficient performance for the number of video streams to be supported. For example, a small capacity video server could be embodied using a RISC System/6000™ system while a larger capacity server could be embodied using an ES/9000™ system (both available from International Business Machines Corporation of Armonk, N.Y.). The disks 102 can be, for example, a conventional RAID-5 disk array. The communication network 114 can be, for example, a fiber optic network or a conventional bidirectional cable network. The client stations 122 can be embodied as a set-top box including the memory buffer 130. The decoder 132 should be such that it conforms to the format of the video blocks (as read from the buffer 130). Typically, this will be a decoder complying with the MPEG-1 or MPEG-2 compression standards.

Each movie is partitioned into segments $S_1, S_2, \ldots S_R$ of geometrically increasing sizes such that $S_i = \alpha S_{i-1}$. The geometric parameter $\alpha$ is larger than 1. Alternatively, this partitioning employs a general Fibonacci sequence in which the segment sizes can be related as follows:

$$S_i = \alpha \sum_{k=1}^{i-1} S_k$$

The network 120 is divided into R channels. Each of the segments of size $S_i$ is transmitted only on channel i.

Figure 1:
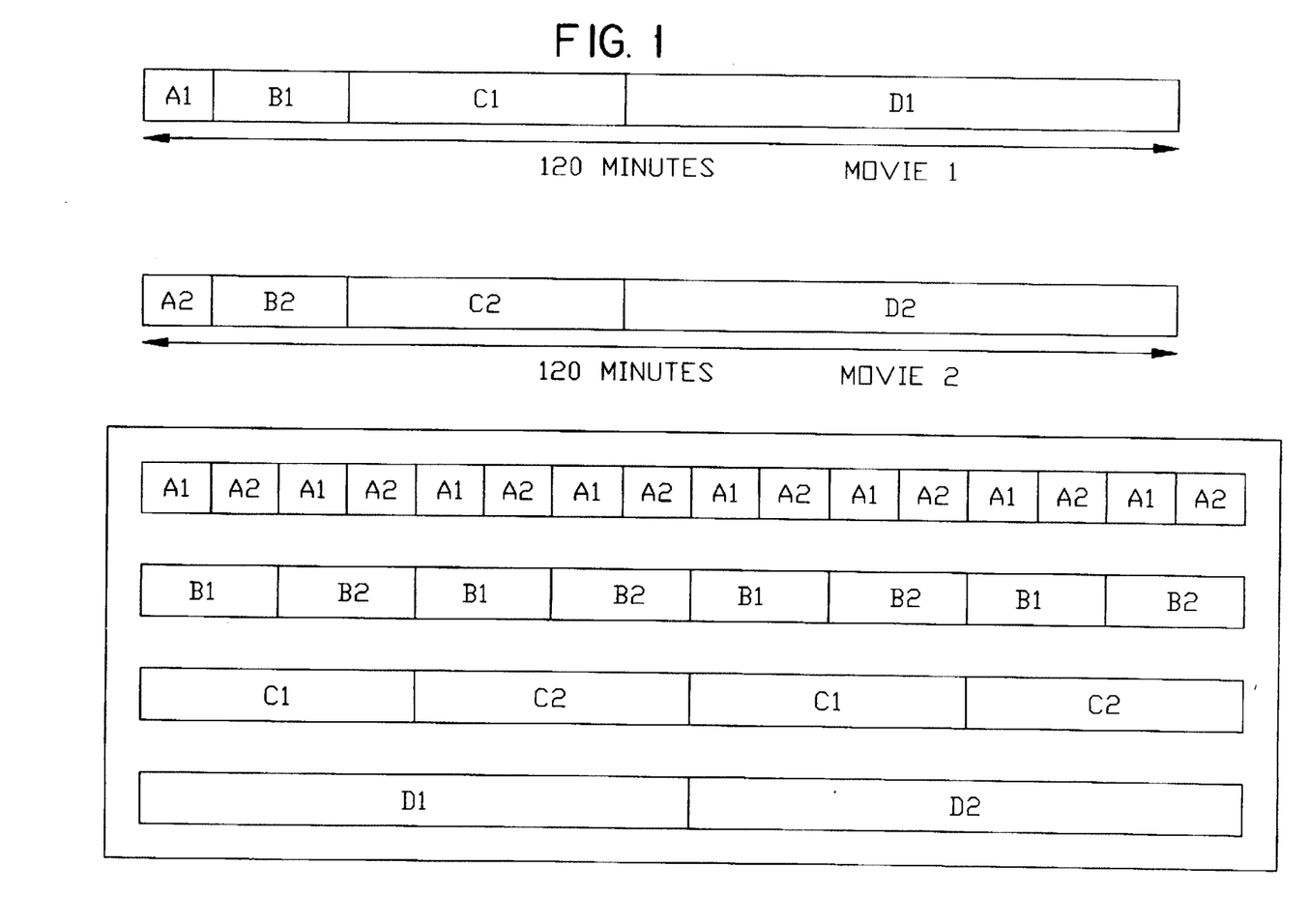
FIG. 1 illustrates segment division.

FIG. 1 illustrates the segment division in the conventional VI scheme. This figure illustrates the case for 2 movies. (This can be generalized to any number of movies.) Each of the movies is divided into 4 segments, such that the (i+1)th segment is twice as large as the ith segment. Thus, as shown in the figure, movie 1 is divided into the 4 segments A1, B1, C1, and D1, while the movie 2 is divided into the 4 segments A2, B2, C2, and D2.

On the first channel, only the segments of the smallest size are transmitted. Thus, on the first channel, only the segments A1 and A2 are transmitted. On the second channel, the next largest segments B1 and B2 are transmitted, the next largest segments C1 and C2 are transmitted on the third, and the largest segments D1 and D2 are transmitted on the fourth.

In order to start to receive transmission of (say) movie 1, the client latches on to the first segment (A1) of the movie. The transmission rate on each channel is larger than the consumption rate. Consequently, as a particular segment (A1) is being transmitted, video data builds up (is buffered) at the client end. After the transmission of A1 has been completed, this buffered data is used to continue the uninterrupted transmission at the user end, while the client tries to latch on into the next segment B1. This process continues for each successive segment until the whole movie has been accessed. The transmission and reception parameters are chosen in such a way that the transmission can be carried on continuously without any interruption.

In the present embodiment, each segment is divided into multiple blocks. However, in contrast to the VI scheme, the blocks are not transmitted in their natural sequence. Instead, the order of the blocks is permuted in such a way that the storage requirements are reduced substantially.

Figure 2:
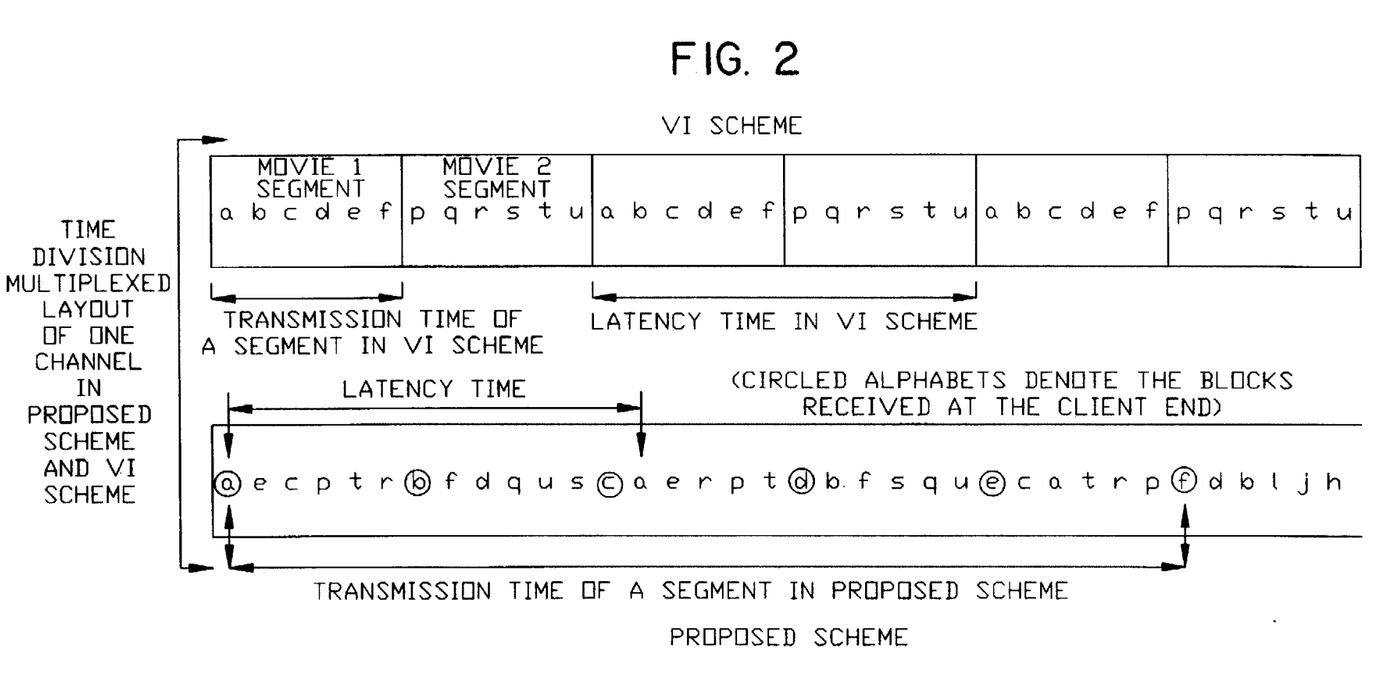
FIG. 2 presents the block transmission order in accordance with an embodiment of the present invention.

An example of the general order in which the blocks are transmitted in the VI scheme versus the present scheme is illustrated in the FIG. 2. FIG. 2 shows the first channel of FIG. 1 in which the segments A1 and A2 are transmitted. The segment A1 is divided into 6 blocks: a, b, c, d, e, f. The segment A2 is divided into the 6 blocks labeled p, q, r, s, t, u. The top half of FIG. 2 illustrates the order in which the blocks are transmitted in the VI scheme. The lower half of FIG. 2 illustrates the order in which the blocks are transmitted in the present scheme which is a permutation based scheme.

In the present scheme, the video server staggers and interleaves multiple copies of a segment. Each copy is referred to as a transmission group. In the example of the present scheme provided in FIG. 2, every 6th block is consecutive and it forms a group. In general, every Gth block is consecutive, and the parameter G is chosen in a way which is described later.

In FIG. 2, three transmission groups are shown. The first group is (a, b, c, d, e, f) where the blocks are circled. The second group is (e, f, a, b, c, d), where the blocks are interleaved with the first one and located one position to the right. The third group is (c, d, e, f, a, b), where the blocks are interleaved with the first one and located two positions to the right. The staggering distance of the second group from the first group is 2 counting cyclically backward where that of the third group is 4 counting cyclically backward. The methods to determine the number of groups to be staggered and the staggering distance are provided later.

Note that in FIG. 2 all the blocks corresponding to one particular group are circled. All of these blocks are received at the client end in accordance with the principles of the present invention. Thus, from the client point of view, it has to receive every Gth block corresponding to a particular group. As discussed with respect to FIG. 2, a group is formed by every 6th block in the diagram. Thus, there are 6 groups in all, i.e. 3 groups for each video. Further, every pair of consecutive groups of a segment are (cyclically) distant from one another by two blocks. In general every Gth block is consecutive, and the client latches onto the time division from which to tap these blocks.

It can be seen from FIG. 2 that the latency time in both of the VI scheme and the present scheme is the same, when $S_i = \alpha S_{i-1}$. However, the present scheme also considers a general Fibonacci sequence in which the segment sizes can be related as follows:

$$S_i = \alpha \sum_{k=1}^{i-1} S_k$$

This reduces the latency and further decreases buffer requirement.

The above described scheme staggers the various segments in such a way that the transmission rate is greatly reduced. This reduced transmission rate helps in reducing the storage requirements at the client substantially. The larger the number of groups staggered and interleaved in the transmission of each segment the greater the reduction of storage requirement at the client. At the same time, this staggering is limited by the fact that too much of it may not satisfy the isochronous requirement at the client end. Thus, the various segments should be staggered by the maximum amount without violating the client consumption requirement for continuous showing.

Within a segment, the distance between consecutive blocks in a group should be less than the play time of a block. Furthermore, there is an additional requirement between the consecutive segments of a movie. When the ith segment is not begun to be received before the end of the consumption of the (i−1)th segment, it is called a hiccup. While pursuing staggering to reduce storage requirement, one needs to at the same time avoid creating a hiccup. It is noted that the last segment may be staggered only under the constraint of the client consumption rate, because there is no danger of a hiccup in that case.

Assume that the network bandwidth is B, the consumption rate is c, and the number of movies to be shown is N. The length of the movie is assumed to be L. Let p be the number of groups staggered or interleaved in the transmission of each segment and $p_{last}$ be that for the last segment. In the preferred embodiment, 1. Choose $\alpha$ to be a small integer. In practice, setting $\alpha=2$ turns out to be a good choice.

2. Choose R to be the largest integer value which is less than or equal to 8, which satisfies the following relationship:

$$R \leq \frac{B}{N(\alpha+1)c}$$

The value 8 is arbitrary because in practice when $\alpha$ is 2, and R is 8, the user latency is so small, that any further improvement is superfluous. Thus, we choose:

$$R = \left[ \min \left\{ 8, \frac{B}{N(\alpha+1)c} \right\} \right]$$

3. Divide the movie into generalized fibonacci segments, $S_1, S_2, \ldots S_R$, satisfying the following two relationships:

$$\sum_{i=1}^{R} S_i = L$$

and $$S_i = \alpha \sum_{k=1}^{i-1} S_k$$

4. Choose p to equal to the largest integer which satisfies:

$$p \leq \frac{B}{NRc} - \alpha + 1$$

Consequently, we choose:

$$p = \left[ \frac{B}{NRc} - \alpha \right] + 1$$

5. Choose:

$$p_{last} = \left[ \frac{B}{NRc} \right]$$

6. Divide each segment $S_i$ into $pL_i$ blocks for each i∈1. . . (R−1). Thus each segment $S_i$ is divided into a multiple of p blocks. The value $L_i$ is chosen as large as possible for each segment $S_i$. Further, the last block $S_R$ is divided into $p_{last} L_R$ blocks.

Note that $L_i$ (respectively, $L_R$) is the staggering distance among the p (respectively, $p_{last}$) transmission groups of each segment (respectively, the last segment). Furthermore, for each movie, the distance between consecutive blocks of a segment (G) is equal to p except for the last segment where the distance is $p_{last}$. Hence, for N movies sharing the channels, the distance is Np for each segment, except the last segment where the distance is $Np_{last}$.

The basic order of transmission of the blocks for the different channels and movies is as follows:

for q=1 to N (movie number) for i=1 to R (channel number) transmit the next block in sequence for channel i and movie q next i next q We assume that the transmission is divided into R channels and consider the transmission on the ith channel for a particular movie q.

Figure 4:
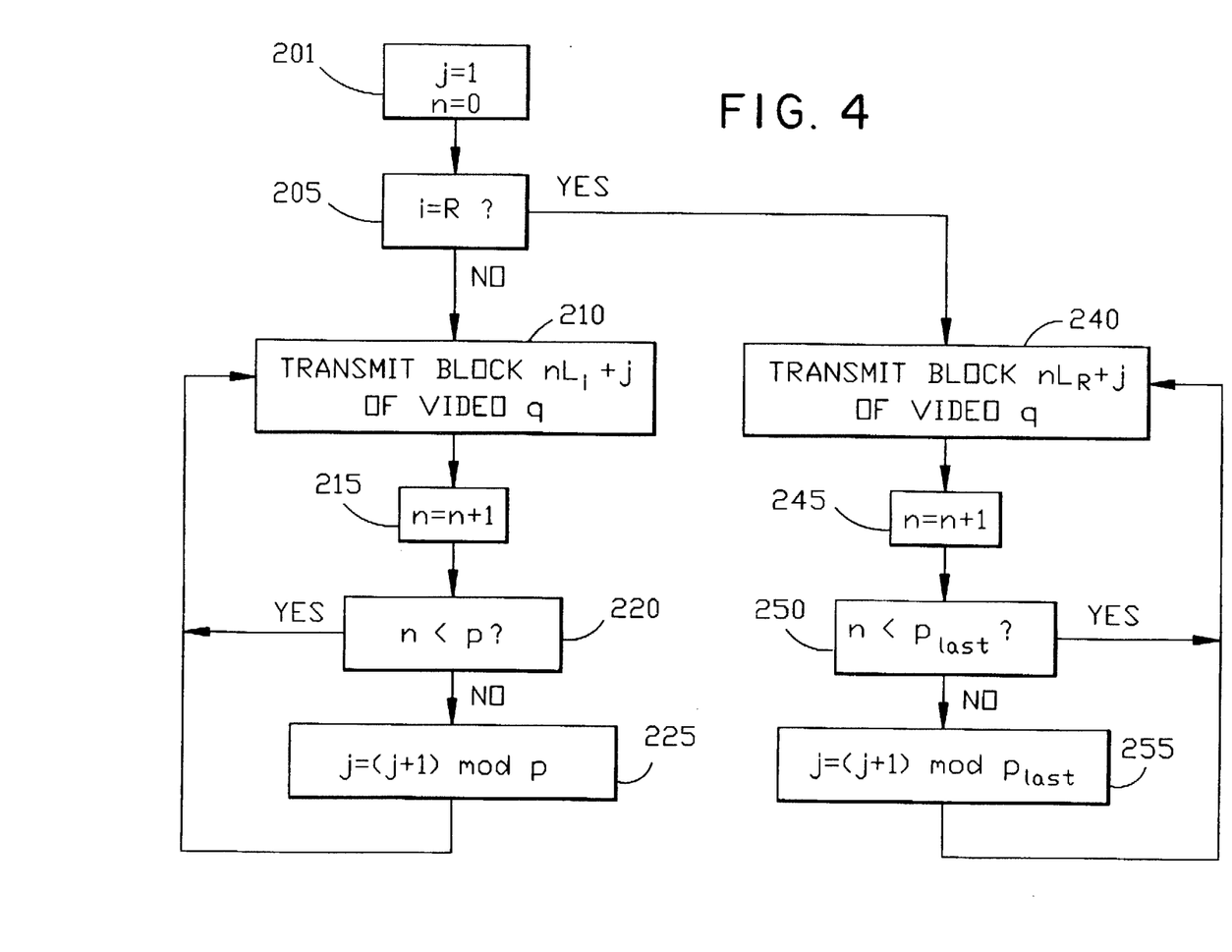
FIG. 4 is a flow chart of the block selector in the server of FIG. 3.

FIG. 4 presents a flow chart of the server block selector 118 of FIG. 3 according to an embodiment of the present invention. The flowchart shows the sequence in which blocks are transmitted at the client end for a particular channel i and movie q. It should be understood, however, that the sequence of transmission is actually interspersed using time division multiplexing. Channel R employs a slightly different transmission algorithm from other channels.

In step 201, the indexing variables for transmission blocks are initialized, where j is set to 1 and n is set to zero.

In step 205 the value of the channel number (i) is checked. If i is less than R (the last channel), block $nL_i+j$ is selected for the next transmission in step 210. n is then incremented by 1 in step 215.

In step 220, it is determined if n is less than p (the number of groups per segment other than the last segment). If n is less than p, step 210 is executed again for the next transmission. Otherwise, the channel number j is set to (j+1) mod p in step 225.

If, in step 205, it is determined that i is set to the last channel number R, block $nL_R+j$ is selected for the next transmission in step 240. Then, n is then incremented by 1 in step 245. In step 250, if n is less than $p_{last}$ (the number of groups in the last segment), step 240 is executed again for the next transmission. Otherwise j is set to (j+1) mod $p_{last}$ in step 255.

Figure 5:
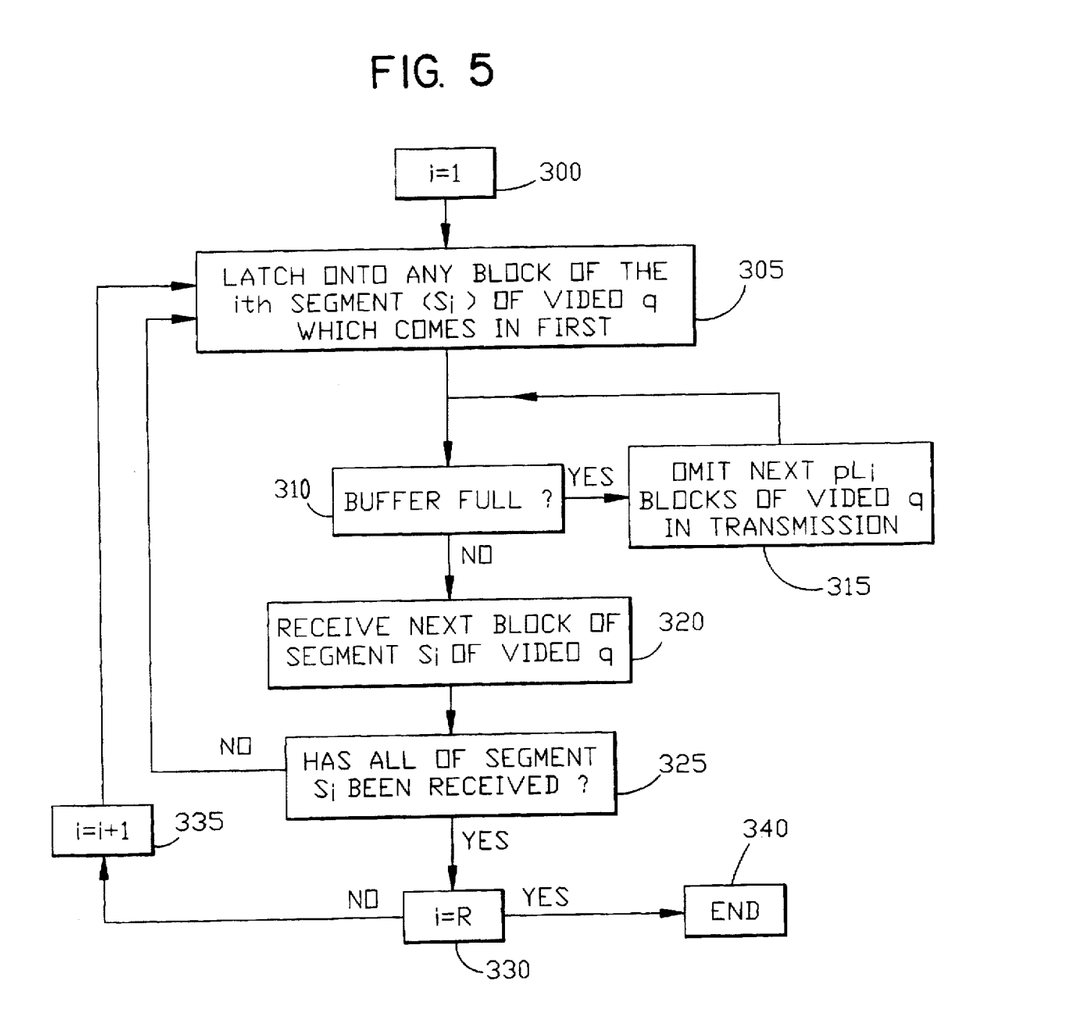
FIG. 5 is a flow chart of the channel/block selector in the client stations of FIG. 3.

FIG. 5 shows a flow chart of the client station channel/block selector 128 according to an embodiment of the present invention. Assume that the client wants to receive video q. In step 300, the indexing variable i on the next segment to receive is set to 1.

In step 305 the receiver latches onto any block of the ith segment of video q which comes in first on channel i. Then, in step 310, the channel/block selector checks whether the buffer 130 is full. If yes, the next $pL_i$ blocks of video q in transmission is skipped. Otherwise, in step 320, the channel/block selector 128 receives the next block of segment $S_i$ of video q which first arrives on channel i and stores in the buffer 130.

In step 325, the channel/block selector checks whether all blocks of segment $S_i$ have been received. If so, in step 330, it is determined whether i is equal to R. If all blocks have not been received, the channel/block selector returns to step 305.

If, in step 330, it is determined that i is not equal to R, in step 335 i is incremented by 1 and then the channel/block selector returns to step 305. If, however, it is determined that i is equal to R, the entire video has been received and the channel/block selector exits in step 340.

Note that in the client receiving algorithm, the number of blocks to be skipped by the client before receiving the next consecutive block is almost a constant, but not quite. Every once in a while, the next block to be received is spaced one block ahead of the distance between the previous two blocks in the same group. This can be done either by incorporating header information at the front of the blocks which describes which movie a block belongs to, or it can be done by simply skipping a block after receiving every $L_i$ blocks from the segment $S_i$.

The present invention is also applicable if frequency division multiplexing is used. At the broadcasting server, again each video is divided into multiple segments and each segment is divided into blocks. Each channel is divided into p subchannels and the staggered groups for each segment is now mapped onto the subchannels. The blocks in each segment are transmitted concurrently on the multiple subchannels with different phase shifts corresponding to the staggering distance. The methods to determine p and the staggering distance is the same as before. At the client end, the appropriate subchannel is selected based on the phase shift requirement to receive the next block in order to minimize the storage requirement.

Figure 6:
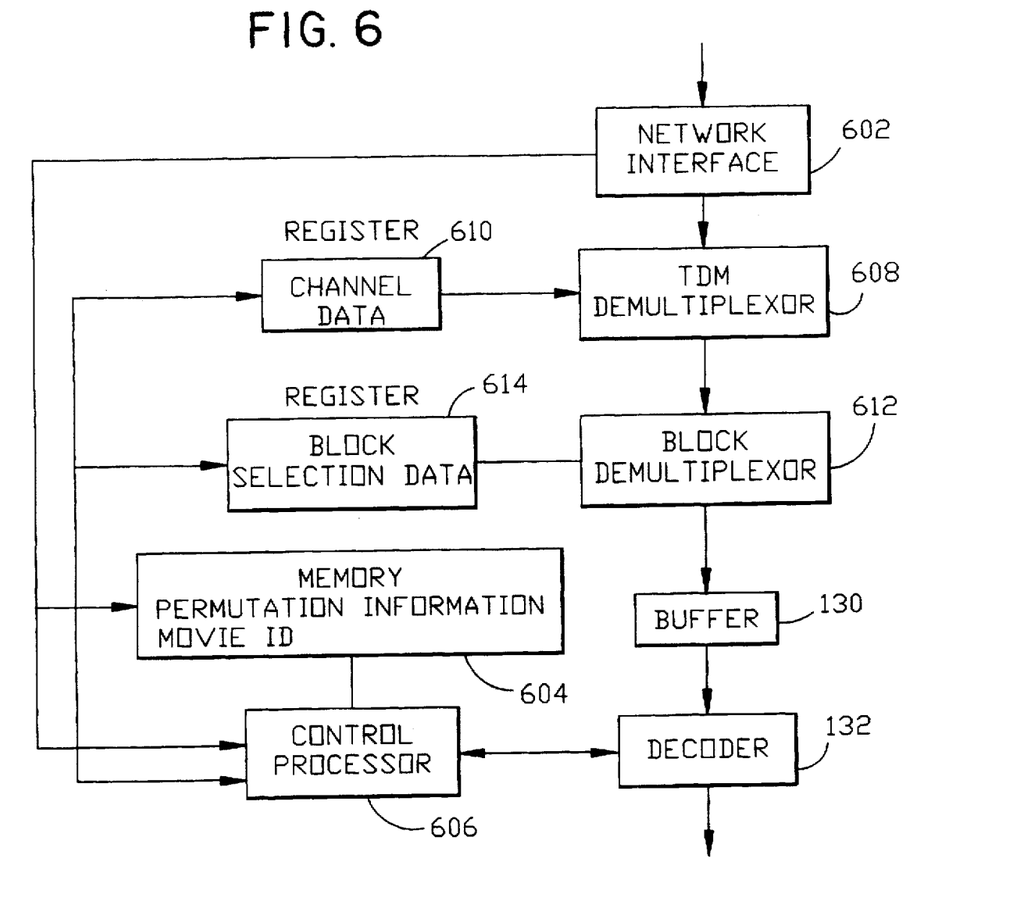
FIG. 6 is a block diagram of a client station according to an embodiment of the present invention.

FIG. 6 is a block diagram of a client station 130 according to an embodiment of the present invention. The client station includes a network interface 602 which provides the electrical and communications interface to the network 114. Information from the network is routed to the appropriate client station components by the network interface 602.

The Permutation Information 124, Movie ID 126 as well as other conventional timing information is directed along a first path. The Permutation Information 124 and Movie ID are stored in a memory 604 while the timing information is provided to a control processor 606. The control processor 606 operates under program control in accordance with the flowchart of FIG. 5.

The video blocks are directed along a second path to a TDM demultiplexor 608. The TDM demultiplexor uses the channel data portion of the Movie ID (the data which indicates which channels a movie and its particular segments is being carried on) as a select input. The control processor loads a register 610 (which provides the TDM demultiplexor's select input) with the appropriate channel data for receiving a desired segment.

The selected segment is provided from the output to the TDM Demultiplexor to the input of a Block demultiplexor 612. The select input of the Block demultiplexor is provided by a second register 614 which the control processor loads with the appropriate block selection data as determined in accordance with the flowchart of FIG. 5.

The selected block is provided to a buffer memory 130 in which it is temporarily stored and then provided to a decoder 132. The decoder 132 decodes the buffered blocks in temporal order and, in turn, provides a video output to a user display device.

Those of ordinary skill in the art will understand that various timing signals, which will not be described in detail here, are provided to each of the components of the client station to ensure its proper operation.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of broadcasting any of audio programs, video programs, audio-visual programs and other programs, for use in a system wherein the programs are broadcast to receiving stations, comprising the steps of:
   repetitively broadcasting to the receiving stations a given portion of a particular program; and,
   repetitively broadcasting to the receiving stations, less frequently than the given portion, a subsequent portion of the particular program;
   wherein data blocks of at least one of the given portion and the subsequent portion are broadcast in varying permutations from one repetition to a next repetition.

2. The method of claim 1 wherein the given portion includes the commencement of the program.

3. The method of claim 1 wherein the given portion of the particular program is broadcast on a first communication channel and the subsequent portion of the particular program is broadcast on a second communication channel.

4. The method of claim 3 wherein the given portion of the program is of a shorter performance duration than the second portion of the program.

5. A method of broadcasting any of audio programs, video programs, audio-visual programs and other programs, for use in a system of a type wherein the programs are broadcast to receiving stations, comprising the steps of:
   repetitively broadcasting to the receiving stations, a given portion of a particular program; and,
   repetitively broadcasting to the receiving stations, less frequently than the given portion, subsequent portions of the particular program;
   wherein each portion is of a length which is proportional to a sum of the lengths of all preceding portions.

6. The method of claim 5 wherein data blocks of at least one of the given portion and the subsequent portions are broadcast in varying permutations from one repetition to a next repetition.

7. The method of claim 6 wherein the given portion includes the commencement of the program.

8. A method of receiving any of audio programs, video programs, audio-visual programs and other programs, comprising the steps of:
   (a) receiving a transmission comprising repetitive broadcasts of various portions of a particular program wherein data blocks of at least one broadcast of at least one of the portions are temporally permuted as compared to their natural presentation order;
   (b) determining a natural order of the data blocks;
   (c) identifying a next data block required for a natural order presentation of the program to a viewer;

(d) latching onto the next data block in the natural order from a repetitive broadcast of each portion and skipping other data blocks in the broadcast; and, (e) repeating steps (c) and (d) for subsequent repetitive broadcasts of each portion until each data block has been latched in the natural order.

9. A method of broadcasting multimedia programs for use in a system wherein the programs are broadcast to receiving stations, comprising the steps of:

repetitively broadcasting to the receiving stations a plurality of portions of a multimedia program, each portion being broadcast less frequently than those portions of the multimedia program which are temporally previous in viewing order;

wherein each of the portions comprise a plurality of data blocks which vary in permutation between one broadcast of a portion and a subsequent broadcast of the portion and wherein each portion is of a longer viewing length than the portions of the multimedia program which are temporally previous in viewing order.

10. A client station for receiving broadcasted multimedia programs for use in a system wherein the multimedia programs are transmitted as a plurality of repetitively broadcast segments and wherein each of the segments includes a number of blocks which can vary in permutation from broadcast to broadcast, comprising:

a receiver having a channel selector and a block selector;

the channel selector including means for identifying channels on which a particular program is being broadcast and means for receiving blocks from the channels;

the block selector, coupled to the channel selector, the block selector including means for determining a natural viewing order of the blocks within each broadcast of a segment;

a buffer memory, coupled to the block selector, for storing from each broadcast of a segment, a next data block in the natural order; and, a decoder, connected to receive the data blocks stored in the buffer memory.

11. A multimedia server, comprising:

a plurality of disks having data blocks of a multimedia presentation stored thereon;

a block selector for formatting the multimedia presentation into a plurality of segments, each of the segments including a temporally distinct portion of the multimedia presentation; and, broadcast means for repetitively broadcasting to the receiving stations a plurality of portions of a multimedia program, each portion being broadcast less frequently than those portions of the multimedia program which are temporally previous in viewing order;

wherein each of the portions comprise a plurality of data blocks which vary in permutation between one broadcast of the portion and a subsequent broadcast of the portion and wherein each portion is of a longer viewing length than the portions of the multimedia program which are temporally previous in viewing order.

* * * * *